United States Patent
Patel et al.

(10) Patent No.: US 8,373,318 B2
(45) Date of Patent: Feb. 12, 2013

(54) TERMINAL LEAD INSULATOR ASSEMBLY FOR WOUND FIELD SYNCHRONOUS MACHINE

(75) Inventors: Dhaval Patel, Loves Park, IL (US); Jan Henry Abels, Rockford, IL (US); Eric J. Cunningham, Winnebago, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 347 days.

(21) Appl. No.: 12/771,065

(22) Filed: Apr. 30, 2010

(65) Prior Publication Data

US 2011/0266899 A1    Nov. 3, 2011

(51) Int. Cl.
*H02K 11/00* (2006.01)

(52) U.S. Cl. ......................................... 310/71

(58) Field of Classification Search ............ 310/71, 310/88, 89, 43
See application file for complete search history.

(56) References Cited

U.S. PATENT DOCUMENTS

| | | | |
|---|---|---|---|
| 2,583,804 A * | 1/1952 | Andrus ........................... 310/87 |
| 4,486,801 A | 12/1984 | Jackovich et al. |
| 5,059,826 A | 10/1991 | Huehne |
| 5,274,292 A * | 12/1993 | Lemmer et al. ............... 310/233 |
| 5,334,025 A | 8/1994 | Fohl |
| 6,114,633 A * | 9/2000 | Duhancik ............. 174/152 GM |
| 6,465,928 B1 | 10/2002 | Shervington et al. |
| 6,628,022 B2 | 9/2003 | Clayton et al. |
| 6,628,023 B1 * | 9/2003 | Paquet ........................... 310/71 |
| 6,858,955 B2 * | 2/2005 | Lau ................................ 310/51 |
| 6,882,069 B1 | 4/2005 | Kashihara et al. |
| 6,943,532 B1 | 9/2005 | Kouwa et al. |
| 7,262,537 B2 | 8/2007 | Worley et al. |
| 7,292,003 B1 | 11/2007 | Baker |
| 7,486,053 B2 | 2/2009 | Qi et al. |

* cited by examiner

*Primary Examiner* — Nguyen N Hanh
(74) *Attorney, Agent, or Firm* — Carlson, Gaskey & Olds, PC

(57) ABSTRACT

A terminal lead insulator assembly for use in a wound field synchronous machine has a generally cylindrical skirt extending in a first direction from a radially larger face. The radially larger face is formed with a plurality of radially outwardly extending ears. The ears include central openings for receiving electrical connections. A rotor assembly, a wound field synchronous machine and a method of assembling such a rotor assembly, each of which include the terminal lead insulator assembly as mentioned above, are also disclosed and claimed.

11 Claims, 5 Drawing Sheets

TERMINAL LEAD INSULATOR ASSEMBLY FOR WOUND FIELD SYNCHRONOUS MACHINE

BACKGROUND

This application relates to a terminal lead insulator assembly, which properly positions and protects terminal leads for a wound field synchronous machine.

Wound field synchronous machines are known and include a main field winding which is driven to rotate relative to a main stator. The main field winding is part of a rotor assembly that also carries exciter windings. A diode pack is typically provided to rectify AC power generated by the exciter. The rectified power takes the form of DC power and is delivered to the main field windings.

In the prior art, electrical connections must be made between the main windings and the diode pack, and between the exciter windings and the diode pack.

In some prior wound field synchronous machines, the electrical connections and wires extended through a shaft which rotates with the rotor and windings. More recently, in some wound field synchronous machines, these electrical connections have been positioned outside the shaft, and are generally unprotected within the overall rotor assembly.

SUMMARY

An electrical connection protector or terminal lead insulator assembly for use in a wound field synchronous machine has a generally cylindrical skirt extending in a first direction from a radially larger face. The radially larger face is formed with a plurality of radially outwardly extending ears. The ears include central openings for receiving electrical connections. A rotor assembly, a wound field synchronous machine and a method of assembling such a rotor assembly, each of which include the terminal lead insulator assembly as mentioned above, are also disclosed and claimed.

DETAILED DESCRIPTION

Figure 1:
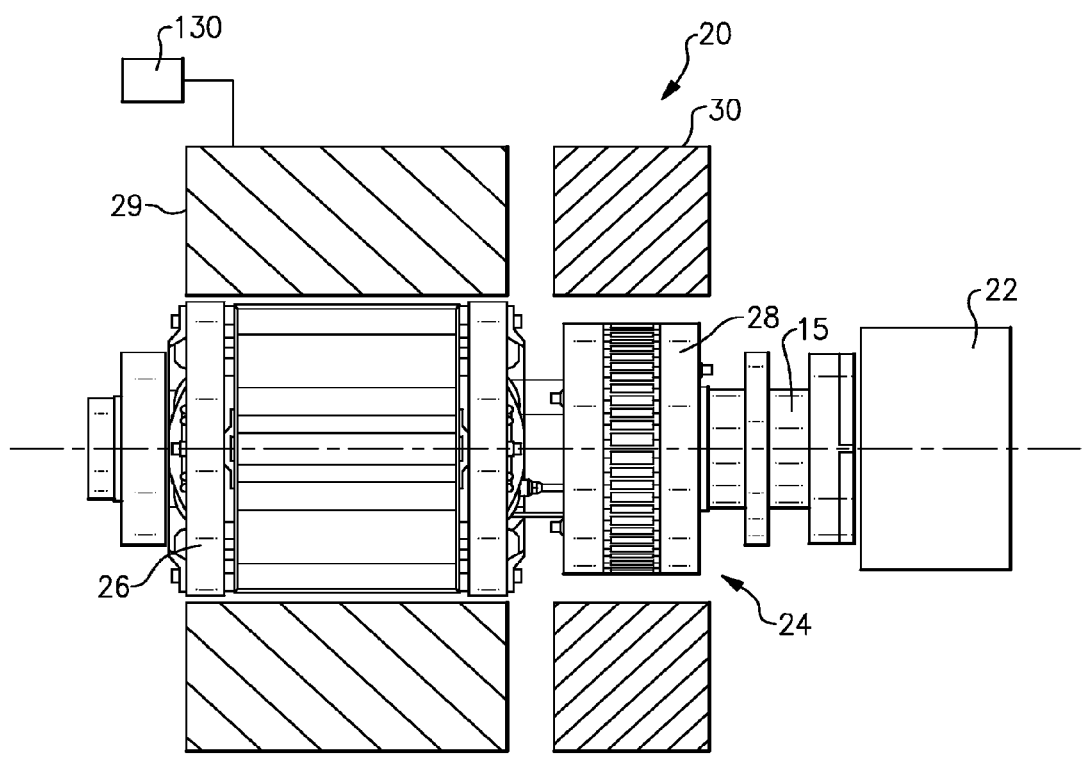
FIG. 1 schematically shows a wound field synchronous machine.

FIG. 1 illustrates a wound field synchronous machine 20 schematically. A source of drive 22, such as a gas turbine engine and gear train drives a rotor assembly 24 of the wound field synchronous machine 20. Exciter rotor 28 and main rotor 26, are driven to rotate with a shaft 15, and rotate adjacent exciter stator 30, and main stator 29. The exciter rotor 28 contains the exciter rotor windings. The main rotor 26 contains the main field windings. This structure may generally be as known, and operates to generate electricity which is transmitted from the main stator 29 to a user 130. Additionally, this structure may operate to generate torque when a user 130 provides electricity to the main stator 29. The exciter rotor winding 28 operates to convert power from the exciter stator to be sent to the main field winding 26 via the diode pack 101 (see FIG. 4), again as known.

Figure 2A:
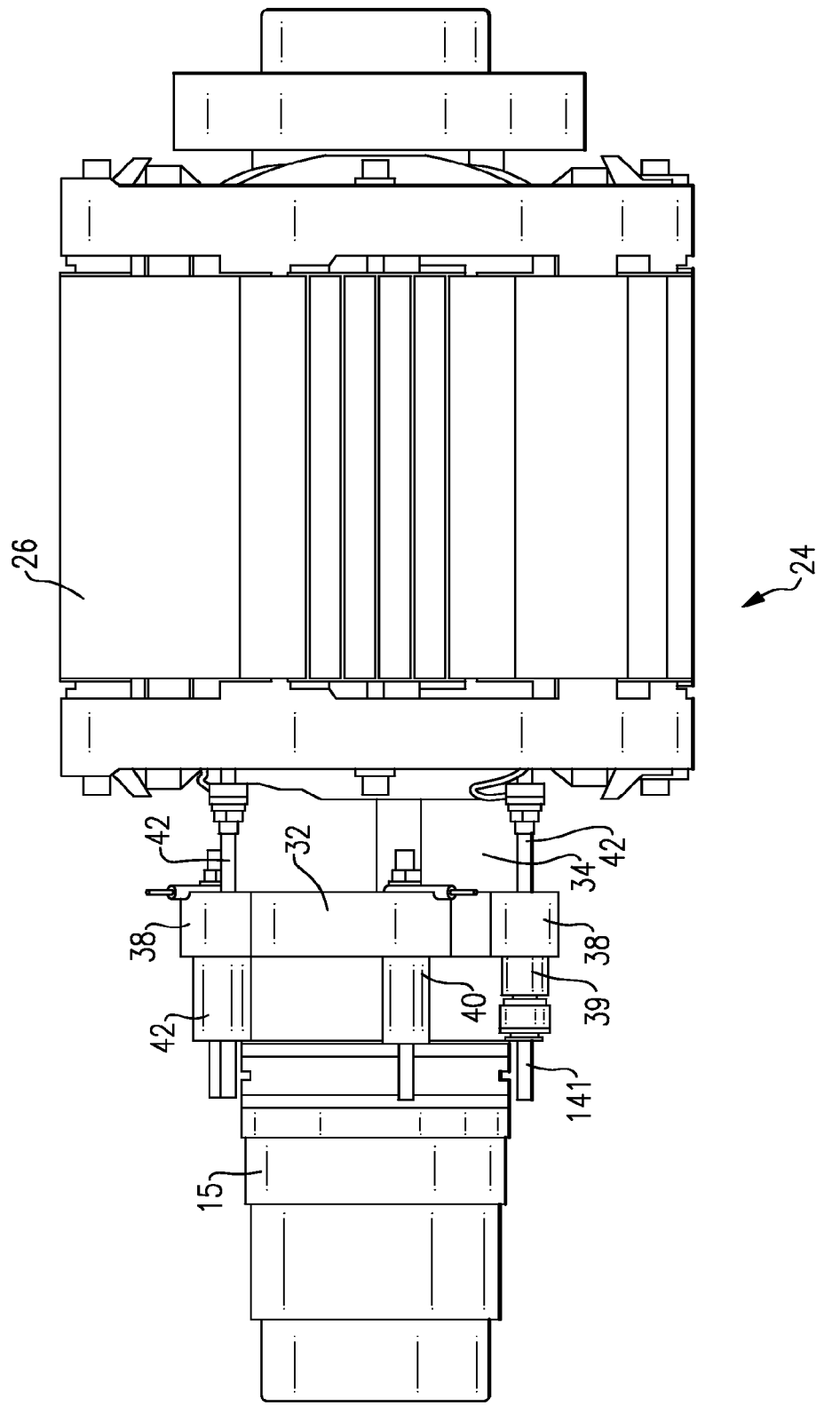
FIG. 2A is a side view of a portion of the rotor of the wound field synchronous machine.

FIG. 2A shows the rotor assembly 24 having the exciter rotor 28 winding 28 removed. In addition, a diode pack, which could not be seen in FIG. 1, is also removed. As can be appreciated from FIGS. 2A, 2B and 3, there are a plurality of ears 38 associated with a terminal lead insulator assembly 32 (also referred to as electrical connection protector 32). The ears 38 mechanically support and protect bus bar connections 40 and 42, as well as receive a positioning pin 39. Positioning pin 39 serves to index and position the terminal lead assembly protector 32, and hence the connections bus bars 40 and 42. To do so, an end 141 of the positioning pin 39 is received in the diode pack 101 (see FIG. 4). This properly axially positions the terminal lead assembly protector 32.

DC Connections 42 extend from the diode pack to bus bars 42, and in turn to the main rotor winding 26. There are two such connections.

AC connections 40 connect the diode assembly back to the exciter rotor. There are three such connections.

Figure 2B:
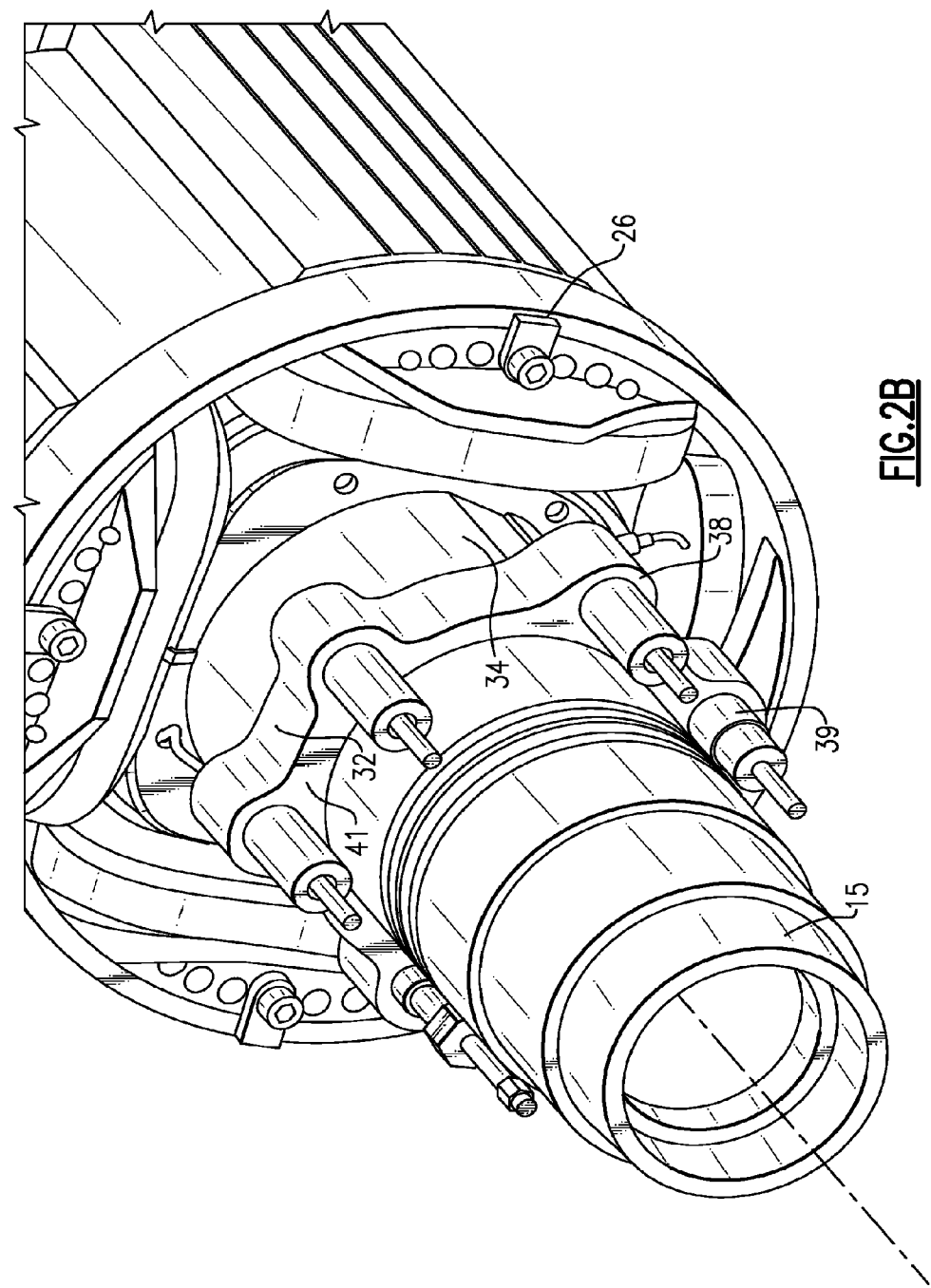
FIG. 2B is a perspective end view of the rotor portion show in FIG. 2A.

The bus bars 40 and 42 as illustrated in FIGS. 2A and 2B are shown with insulators 40, wires, etc. As can be appreciated from FIG. 2B, a skirt 34 that is generally cylindrical in shape extends toward the main rotor winding 26 from a forward face 41 of the protector 32. This skirt provides dielectric protection between the DC connections 42 and the rotor shaft 15.

Figure 3:
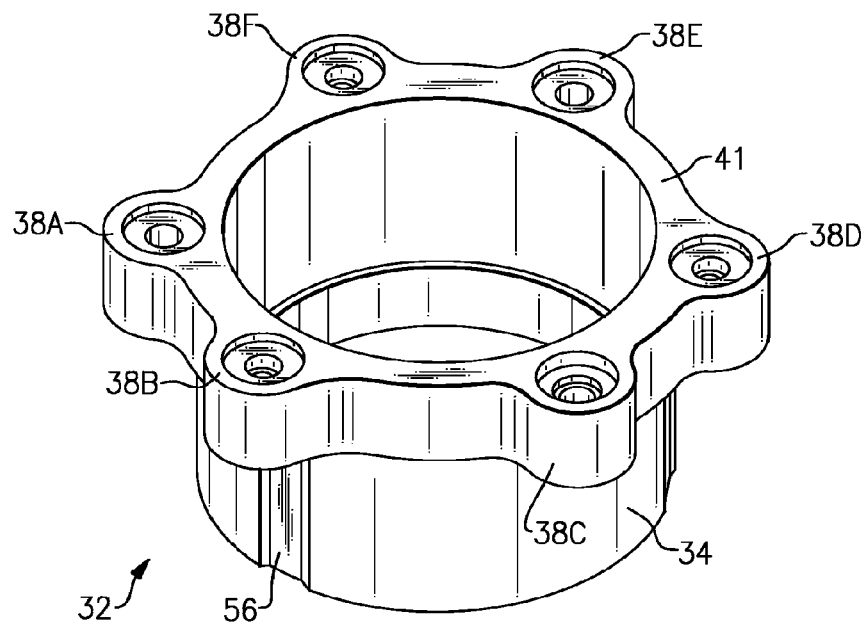
FIG. 3 shows a terminal lead insulator assembly.

As shown in FIG. 3, the terminal lead insulator assembly 32 includes the forward face 41, and the skirt 34. A plurality of ears 38A, 38B, 38C, 38D, 38E and 38F are formed in the face 41. In addition, a groove 56 is formed at an outer periphery of the skirt 34, and serves to provide clearance room for one of the bus bars 42. As is clear from FIG. 3 the ears 38A-38F extend radially outwardly from the outer peripheral surface of the skirt 34.

Figure 4:
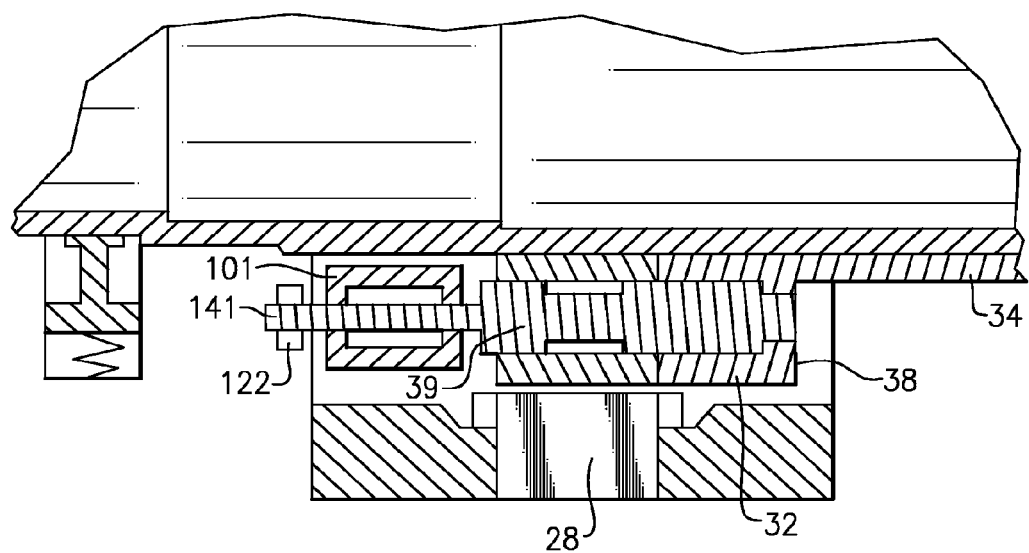
FIG. 4 shows a first detail of the assembled rotor.

As shown in FIG. 4, the exciter rotor 28 surrounds the diode pack 101 (shown schematically). A nut 122 may be placed on the end 141 to secure the positioning pin assembly 39. As can be appreciated from FIG. 4, the face 41 is also positioned radially inwardly of the exciter rotor 28.

Figure 5:
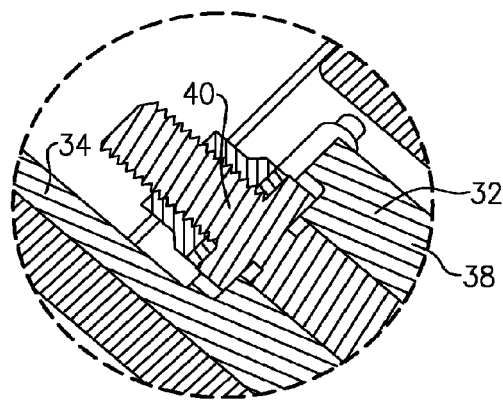
FIG. 5 shows another detail portion.
Figure 6:
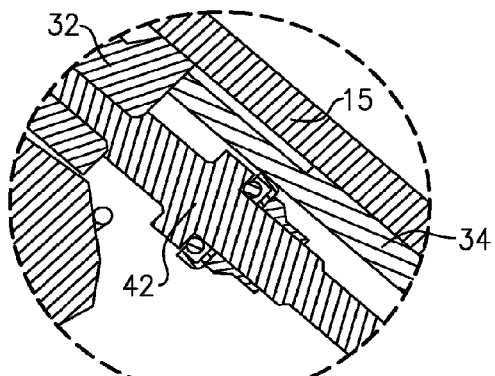
FIG. 6 shows yet another detail portion.

FIG. 5 shows a detail of one of the bus bar connections 40 extending through one of the ears 38. Similarly, FIG. 6 shows one of the bus bar connections 42, extending also through one of the ears 38.

In assembling the wound field synchronous machine 20, the positioning pin assembly 39 is positioned to have the end 141 extend through the diode pack 101, which has previously been positioned within the exciter rotor. The diode pack 101 is now in a fixed radial position, and thus the positioning pin is at a fixed radial position. When the positioning pin is moved into the ear 38 in the protector 32, the protector 32 will be in a fixed circumferential location. The other electrical connections can now be made through the other ears 38 such that they are all properly positioned.

Figure 7:
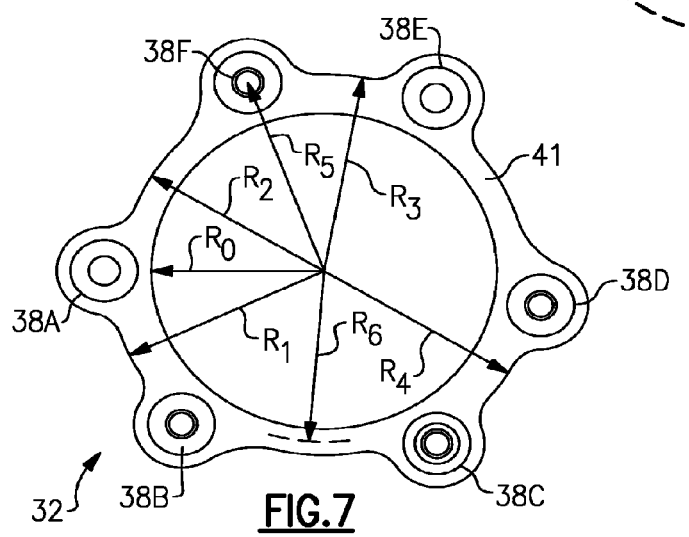
FIG. 7 shows geometric relationships with regard to the terminal lead insulator assembly.

FIG. 7 geometrically shows relationships on the face 41. As shown, radius $R_0$ extends to the inner periphery of the face 41. $R_0$ will also be the inner periphery of the skirt 34. A radius $R_1$ extends to one of the circumferential extending portions between the ears 38A and 38B. Another radius $R_2$ is formed between the ears 38A and 38F. $R_2$ is less than $R_1$, and also less than $R_3$ between ear 38F and 38E, and $R_4$ between ears 38C and 38D. A radius $R_5$ extends to each of the center points of cylindrical connection holes extending through the ears 38A, 38B, 38C, 38D and 38E. A radius $R_6$ extends to the outer periphery of the skirt 34 shown in phantom in this Figure.

In exemplary embodiments, the radius $R_0$ is between 1.04 and 1.55" (26.4 and 39.4 mm), the radius $R_1$ is between 1.28 and 1.92" (32.5 and 48.4 mm), the radius $R_2$ is between 1.20 and 1.80" (30.5 and 45.7 mm), the radii $R_3$ and $R_4$ are equal to $R_1$. The radius $R_5$ is between 1.30 and 1.96" (33.0 and 49.8 mm), and the radius $R_6$ is between 1.13 and 1.169" (28.7 and 29.7 mm).

Figure 8:
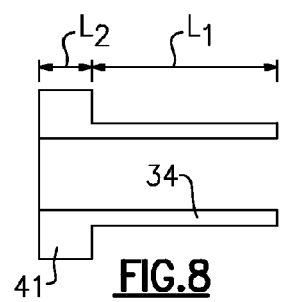
FIG. 8 shows other geometric relationships.

Further, a length $L_1$ of skirt 34 as shown in FIG. 8 is between 0.95 and 1.42" (24.1 and 36.1 mm), whereas a length $L_2$ of the face 41 is between 0.59 and 0.89" (15.0 and 22.6 mm).

In exemplary embodiments, a ratio of $L_1$ to $L_2$ is preferably between 1.55 and 1.75. A ratio of $R_0$ to $R_6$ is preferably between 0.85 and 0.95. A ratio of $R_1$ to $R_2$ is preferably between 1.05 and 1.15. Another ratio of $R_0$ to $R_5$ is between 0.75 and 0.85. Further, another ratio of $R_0$ to $R_1$ is between 0.75 and 0.85.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A terminal lead insulator assembly for use in a wound field synchronous machine comprising:
    a generally cylindrical skirt centered on an axis and extending in an axial direction from a radially larger face, said radially larger face being formed with a plurality of radially outwardly extending ears, said ears including openings for receiving electrical connectors; and
    a ratio of a length of said skirt measured along said axis to an axial length of said radially larger face is between 1.55 and 1.75.

2. The terminal lead insulator assembly as set forth in claim 1, wherein there are six of said ears.

3. The terminal lead insulator assembly as set forth in claim 2, wherein there are a plurality of radially extending portions extending about said axis, and between adjacent ones of said ears, and a radius being defined to an outer periphery of each of said circumferentially extending sections, with at least one of said radii being less than at least a plurality of others of said radii.

4. The terminal lead insulator assembly as set forth in claim 3, wherein a ratio of said plurality of other radii compared to said at least one radius is between 1.05 and 1.15.

5. The terminal lead insulator assembly as set forth in claim 1, wherein a ratio of a radius to an inner periphery of the skirt compared to a radius to the outer periphery of the skirt is between 0.85 and 0.95.

6. The terminal lead insulator assembly as set forth in claim 1, wherein a ratio of a radius to an inner periphery of the skirt compared to a radius to a center of a cylindrical connection hole extending through said ears is between 0.75 and 0.85.

7. The terminal lead insulator assembly as set forth in claim 1, wherein a groove is formed at an outer periphery of the skirt to provide clearance room for a bus bar when the terminal lead assembly is mounted into a rotor assembly.

8. The terminal lead assembly as set forth in claim 7, wherein said ears extending radially outwardly of an outer peripheral surface of said cylindrical skirt.

9. A terminal lead insulator assembly for use in a wound field synchronous machine comprising:
    a generally cylindrical skirt centered on an axis and extending in an axial direction from a radially larger face, said radially larger face being formed with a plurality of radially outwardly extending ears, said ears including openings for receiving electrical connectors;
    a ratio of a length of said skirt measured along said axis to an axial length of said radially larger face is between 1.55 and 1.75;
    there being six of said ears;
    a plurality of radially extending portions extending about said axis, and between adjacent ones of said ears, and a radius being defined to an outer periphery of each of said circumferentially extending sections, with at least one of said radii being less than at least a plurality of others of said radii;
    a ratio of said plurality of other radii compared to said at least one radius is between 1.05 and 1.15;
    a ratio of a radius to an inner periphery of the skirt compared to a radius to the outer periphery of the skirt is between 0.85 and 0.95; and
    a ratio of the radius to the inner periphery of the skirt compared to a radius to a center of cylindrical connection hole extending through said ears is between 0.75 and 0.85.

10. The terminal lead assembly as set forth in claim 9, wherein a groove is formed at an outer periphery of the skirt to provide clearance room for a bus bar when the terminal lead assembly is mounted into a rotor assembly.

11. The terminal lead assembly as set forth in claim 10, wherein said extending radially outwardly of an outer peripheral surface of said cylindrical skirt.

* * * * *